(12) United States Patent
Kalhan

(10) Patent No.: US 9,681,479 B2
(45) Date of Patent: Jun. 13, 2017

(54) DEVICE-TO-DEVICE COMMUNICATION MANAGEMENT USING MACROCELL COMMUNICATION RESOURCES

(71) Applicant: KYOCERA CORPORATION, Kyoto-shi, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/273,237

(22) Filed: Sep. 22, 2016

(65) Prior Publication Data

US 2017/0013661 A1   Jan. 12, 2017

Related U.S. Application Data

(63) Continuation of application No. 14/357,615, filed as application No. PCT/US2012/064711 on Nov. 12, 2012.

(Continued)

(51) Int. Cl.
*H04W 72/04* (2009.01)
*H04W 76/02* (2009.01)
(Continued)

(52) U.S. Cl.
CPC ......... *H04W 76/023* (2013.01); *H04L 5/0051* (2013.01); *H04L 5/0053* (2013.01);
(Continued)

(58) Field of Classification Search
CPC .............................. H04W 72/04; H04W 76/02
See application file for complete search history.

(56) References Cited

U.S. PATENT DOCUMENTS

| 8,432,786 | B2 | 4/2013 | Li et al. |
| 8,923,190 | B2 * | 12/2014 | Ribeiro ................. H04W 28/16 370/327 |

(Continued)

FOREIGN PATENT DOCUMENTS

| JP | H05-145471 | 6/1993 |
| JP | H08-289361 | 11/1996 |

(Continued)

*Primary Examiner* — Xavier Szewai Wong

(57) ABSTRACT

Macrocell communication resources are assigned for device-to-device (D2D) communication between two wireless communication user equipment (UE) devices. A scheduler in a communication system schedules (assigns) scheduled downlink communication resources for downlink transmission of signals from a base station, schedules (assigns) scheduled uplink communication resources for uplink communication from wireless communication UE devices to base stations, and schedules (assigns) D2D communication resources for D2D communication between wireless communication UE devices. The D2D communication resources are selected from either defined downlink communication resources or defined uplink communication resources that are defined by communication specification. The base station sends communication resource allocation (CRA) information to at least one of the wireless communication UE devices where the communication resource allocation information identifies the D2D communication resources for use by the wireless communication UE devices to communicate through a device-to-device (D2D) communication link.

5 Claims, 10 Drawing Sheets

Related U.S. Application Data

(60) Provisional application No. 61/559,393, filed on Nov. 14, 2011, provisional application No. 61/559,412, filed on Nov. 14, 2011, provisional application No. 61/564,584, filed on Nov. 29, 2011.

(51) Int. Cl.

| | |
|---|---|
| *H04W 28/02* | (2009.01) |
| *H04L 5/00* | (2006.01) |
| *H04W 8/00* | (2009.01) |
| *H04W 72/12* | (2009.01) |
| *H04B 7/26* | (2006.01) |
| *H04L 27/26* | (2006.01) |
| *H04W 52/04* | (2009.01) |
| *H04W 84/04* | (2009.01) |
| *H04W 88/06* | (2009.01) |
| *H04W 88/08* | (2009.01) |

(52) U.S. Cl.
CPC ....... *H04W 8/005* (2013.01); *H04W 28/0278* (2013.01); *H04W 72/04* (2013.01); *H04W 72/042* (2013.01); *H04W 72/0413* (2013.01); *H04W 72/0493* (2013.01); *H04W 72/1215* (2013.01); *H04B 7/2621* (2013.01); *H04L 5/0007* (2013.01); *H04L 5/0091* (2013.01); *H04L 27/2601* (2013.01); *H04W 52/04* (2013.01); *H04W 72/0406* (2013.01); *H04W 84/042* (2013.01); *H04W 88/06* (2013.01); *H04W 88/08* (2013.01)

(56) References Cited

U.S. PATENT DOCUMENTS

| | | | |
|---|---|---|---|
| 9,560,662 B2* | 1/2017 | Siomina | H04W 24/10 |
| 2009/0110038 A1 | 4/2009 | Montojo et al. | |
| 2009/0238289 A1 | 9/2009 | Sampath et al. | |
| 2011/0223953 A1 | 9/2011 | Lee et al. | |
| 2011/0275382 A1 | 11/2011 | Hakola et al. | |
| 2012/0069805 A1* | 3/2012 | Feuersanger | H04W 72/1284 370/329 |
| 2012/0083283 A1* | 4/2012 | Phan | H04W 72/048 455/450 |
| 2012/0106517 A1 | 5/2012 | Charbit et al. | |
| 2012/0302272 A1* | 11/2012 | Hakola | H04W 72/10 455/509 |
| 2013/0005377 A1 | 1/2013 | Wang et al. | |
| 2013/0235754 A1* | 9/2013 | Lim | H04W 72/042 370/252 |
| 2014/0064203 A1 | 3/2014 | Seo et al. | |

FOREIGN PATENT DOCUMENTS

| | | |
|---|---|---|
| JP | H11-122159 | 4/1999 |
| JP | 2002-159050 | 5/2002 |
| JP | 2009-017560 | 1/2009 |
| JP | 2009-164863 | 7/2009 |
| WO | WO 2010/082084 | 7/2010 |
| WO | WO 2010/082114 | 7/2010 |
| WO | WO2010102668 A1 | 9/2010 |
| WO | WO 2011/069295 | 6/2011 |
| WO | WO 2011/109941 | 9/2011 |
| WO | WO 2011/130630 | 10/2011 |
| WO | WO 2013/074463 | 5/2013 |

* cited by examiner

DEVICE-TO-DEVICE COMMUNICATION MANAGEMENT USING MACROCELL COMMUNICATION RESOURCES

CLAIM OF PRIORITY

The present application is a continuation of and claims priority to U.S. application Ser. No. 14/357,615, entitled "DEVICE-TO-DEVICE COMMUNICATION MANAGEMENT USING MACROCELL COMMUNICATION RESOURCES", which is a national stage application of PCT/US2012/064711, entitled "DEVICE-TO-DEVICE COMMUNICATION MANAGEMENT USING MACROCELL COMMUNICATION RESOURCES," filed Nov. 12, 2012; which claims priority to Provisional Application No. 61/564,584 entitled "SOUNDING REFERENCE SIGNALS TRANSMISSIONS FOR P2P COMMUNICATION USING MACROCELL DOWNLINK RESOURCES," filed Nov. 29, 2011; to Provisional Application No. 61/559,412 entitled "SOUNDING REFERENCE SIGNALS TRANSMISSIONS FOR P2P COMMUNICATION USING MACROCELL DOWNLINK RESOURCES," filed Nov. 14, 2011; and to Provisional Application No. 61/559,393 entitled "P2P COMMUNICATION USING MACROCELL DOWNLINK RESOURCES," filed Nov. 14, 2011, all assigned to the assignee hereof and hereby expressly incorporated by reference in their entirety.

FIELD

This invention generally relates to wireless communications and more particularly to device-to-device (D2D) communication management using macrocell communication resources.

BACKGROUND

Many wireless communication systems use base stations to provide geographical service areas where wireless communication devices communicate with the base station providing the particular geographical service area. The base stations are connected within a network allowing communication links to be made between the wireless communication devices and other devices. In some circumstances, the communication links are between wireless communication devices that are close to each other. In these situations, it may be preferred to have a direct communication link between the two wireless devices rather than communicating through a base station. Such direct communication between devices is often referred to as device-to-device (D2D) communication or peer-to-peer (P2P) communication.

SUMMARY

Macrocell communication resources are assigned for device-to-device (D2D) communication between two wireless communication user equipment (UE) devices. A scheduler in a communication system schedules (assigns) scheduled downlink communication resources for downlink transmission of signals from a base station, schedules (assigns) scheduled uplink communication resources for uplink communication from wireless communication UE devices to base stations, and schedules (assigns) D2D communication resources for D2D communication between wireless communication UE devices. The scheduled downlink communication resources are selected from defined downlink communication resources defined by a communication specification for downlink communication from the base station and scheduled uplink communication resources are selected from defined uplink communication resources defined by the communication specification for uplink communication to the base station. The D2D communication resources are selected from either the defined downlink communication resources or the defined uplink communication resources. The base station sends communication resource allocation (CRA) information to at least one of the wireless communication UE devices where the communication resource allocation information identifies the D2D communication resources for use by the wireless communication UE devices to communicate through a device-to-device (D2D) communication link.

DETAILED DESCRIPTION

A communication specification defines macrocell communication resources for communication between base stations and wireless communication UE devices. The macrocell communication resources include defined downlink communication resources and defined uplink communication resources, both defined by the communication specification. Downlink communication resources selected from the defined downlink communication resources and assigned (scheduled) for downlink communication are referred to as scheduled downlink communication resources. Uplink communication resources selected from the defined uplink communication resources and assigned (scheduled) for uplink communication are referred to as scheduled uplink communication resources. In accordance with embodiments of the invention, macrocell communication resources are assigned (scheduled) for device-to-device (D2D) communication. Accordingly, either defined downlink communication resources or defined uplink communication resources are scheduled for D2D communication. Macrocell communication resources scheduled for D2D communication are referred to D2D communication resources.

Figure 1A:
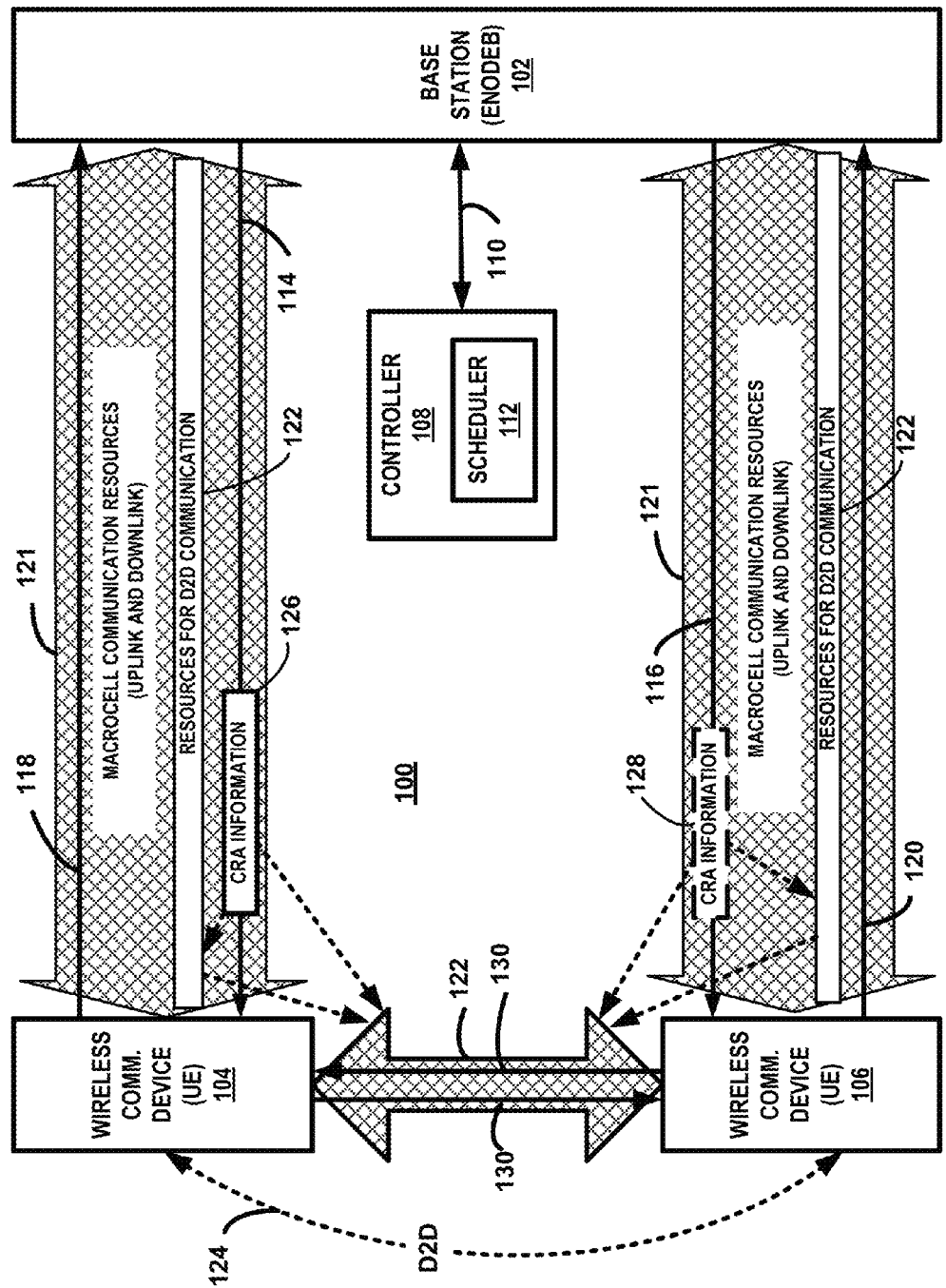
FIG. 1A is a block diagram of a wireless cellular communication system where macrocell communication resources are used for device-to-device (D2D) communication.

FIG. 1A is a block diagram of a communication system 100 where macrocell communication resources are used for device-to device (D2D) communication. A base station 102 provides wireless communication services to wireless communication UE devices 104, 106 within a geographical service area, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller 108 may be performed by the base stations 104, 106. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, sometimes referred to as an eNodeB or eNB, which may include a controller in some circumstances. The base station 102 is connected to a controller 108 through a backhaul 110 which may include any combination of wired, optical, and/or wireless communication channels. For the examples herein, the controller 108 includes the functionality of the Mobility Management Entity (MME) and the Packet Gateway (P-GW). Accordingly, the controller 108 includes a scheduler 112. In the example, the scheduler 112 allocates time-frequency resources for communication between the wireless communication devices 104, 106 as well as between the base station 102 and the wireless communication devices 104, 106.

The wireless (UE) communication devices 104, 106 may be referred to as mobile devices, wireless devices, wireless communication devices, and mobile wireless devices, UEs, UE devices as well as by other terms. The wireless communication devices 104, 106 include electronics and code for communicating with base stations and with other wireless communication devices in device-to-device configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, television, or pool controller.

The base station 102 includes a wireless transceiver that exchanges wireless signals 114, 116, 118, 120 with the wireless communication devices 104, 106. Transmissions from the base stations and from the wireless communication devices 104, 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 121 are used for transmitting the downlink signals 114, 116 and the uplink signals 118, 120. The base station 102 transmits downlink signals 114, 116 to the wireless communication devices 104, 106 using scheduled downlink communication resources of the defined downlink communication resources defined by the communication specification and reserved for downlink communication. The wireless communication devices transmit uplink signals 118, 120 to the base station using scheduled uplink communication resources of the defined uplink communication resources defined by the communication specification and reserved for uplink communication. The macrocell communication resources 121 include frequency bands divided in time where each frequency band and segment of time can be identified by the scheduler 112 and described in control signals sent from the base station 102 to the wireless communication devices 104, 106. The communication specifications, or other system rules, therefore, define applicable communication resources for the downlink and applicable communication resources for the uplink. The scheduler 112 allocates different time-frequency resources to different devices to efficiently utilize the resources while minimizing interference. Accordingly, the scheduled macrocell communication resources used for signals 114, 120 exchanged with one wireless communication device 104 are different from scheduled macrocell communication resources used for other signals 116, 118 exchanged with other wireless communication devices 106. As referred to herein, therefore, the macrocell communication resources 121 are the communication resources reserved for communication by the specification and/or communication system rules. The scheduled resources for transmission for particular signals, however, are a subset of the reserved macrocell communication resources 121 and are typically dynamically changed during operation.

In conventional systems, a scheduler allocates time-frequency resources for communication between the base station and the wireless communication devices. In the examples discussed herein, however, the scheduler 112 also allocates (schedules) time-frequency resources 122 (D2D communication resources 122) for communication between wireless communication devices 104, 106 to establish and maintain a device-to-device (D2D) communication link 124.

In response to determining that two wireless communication devices should establish a D2D connection 124, the controller 108 allocates D2D time-frequency resources 122 to the wireless communication devices 104, 106 by sending communication resource allocation (CRA) information 126. The CRA information 126 may be conveyed to the wireless communication UE devices using control signaling, messages or a combination of the two. In addition, CRA information required by the second wireless communication UE device may be sent to the first wireless communication UE device or may be sent directly to the second wireless communication UE device 106. Accordingly, the CRA information 128 transmitted to the second UE device is illustrated with a dashed box to indicate that the CRA information transmission 128 may be omitted in some circumstances. When the CRA information for the second wireless communication UE device 106 is sent to the first wireless communication UE device 104, the first wireless communication UE device 104 provides the CRA information to the second wireless communication UE device 106 using control signaling over the D2D communication link 124. The CRA information 126, 128 identifies D2D time-frequency resources 122 of the macrocell communication resources 121 to be used by the wireless communication devices in the D2D connection 124. The wireless communication device 104 receives the CRA information 126 and uses the allocated communication resources (time-frequency communication resources) to exchange device-to-device (D2D) signals 130 with another wireless communication device 106 without communicating through the base station 102. As mentioned above, optional CRA information 128 may be sent to the other wireless communication device 106 to identify the downlink communication resources 122 for the D2D connection 124. As discussed below in further detail, downlink resources assigned to the device-to-device connections are not used for downlink communication by the base station. Also, as discussed below, additional information such as control and demodulation information may be exchanged between the wireless communication devices through the D2D link 124.

Therefore, in accordance with the embodiments herein, some of the macrocell communication resources 122 are assigned (scheduled) for device-to-device (D2D) communication between two wireless communication UE devices 104, 106 as needed. As discussed below in further detail, when downlink communication resources assigned for D2D communication are not used for downlink communication. For example, if the communication resources are time-frequency communication resources, the time segments and frequency bands assigned to the D2D communication link are not used by the base station 102 to serve non-D2D wireless communication UE devices. Where uplink communication resources are assigned for D2D communication, the resources are assigned such that communication between a pair of D2D wireless communication UE devices does not interfere with communications between any other D2D wireless communication UE device pair. For example, orthogonal or nearly orthogonal, resources may be used relative to other nearby D2D device pairs. D2D device pairs that are sufficiently far from each other may be able to reuse communication resources and avoid interference. For example, if the D2D devices of each pair are relatively close to each other but the D2D pairs are relatively far from each other, the transmission power level used by each D2D pair may be sufficiently low to allow reuse of communication resources.

As described in further detail below, the communication resource allocation (CRA) information 126 is sent from the base station 102 to a UE device 104 after the system controller 108 determines that a D2D link 124 should be established between the UE device 104 and another UE device 106. The base station 102 may also send communication resource allocation (CRA) information 128 to the other UE device 106 to allocate D2D communication resources for transmission from the other UE device 106.

The UE devices 104, 106 communicate using the assigned communication resources. Since the base station identifies the two UE devices of a D2D device pair that need to communicate with each other directly, the base station 14 is aware of the UE devices of each pair. There can be several D2D UE device pairs within the base station coverage area.

Figure 1B:
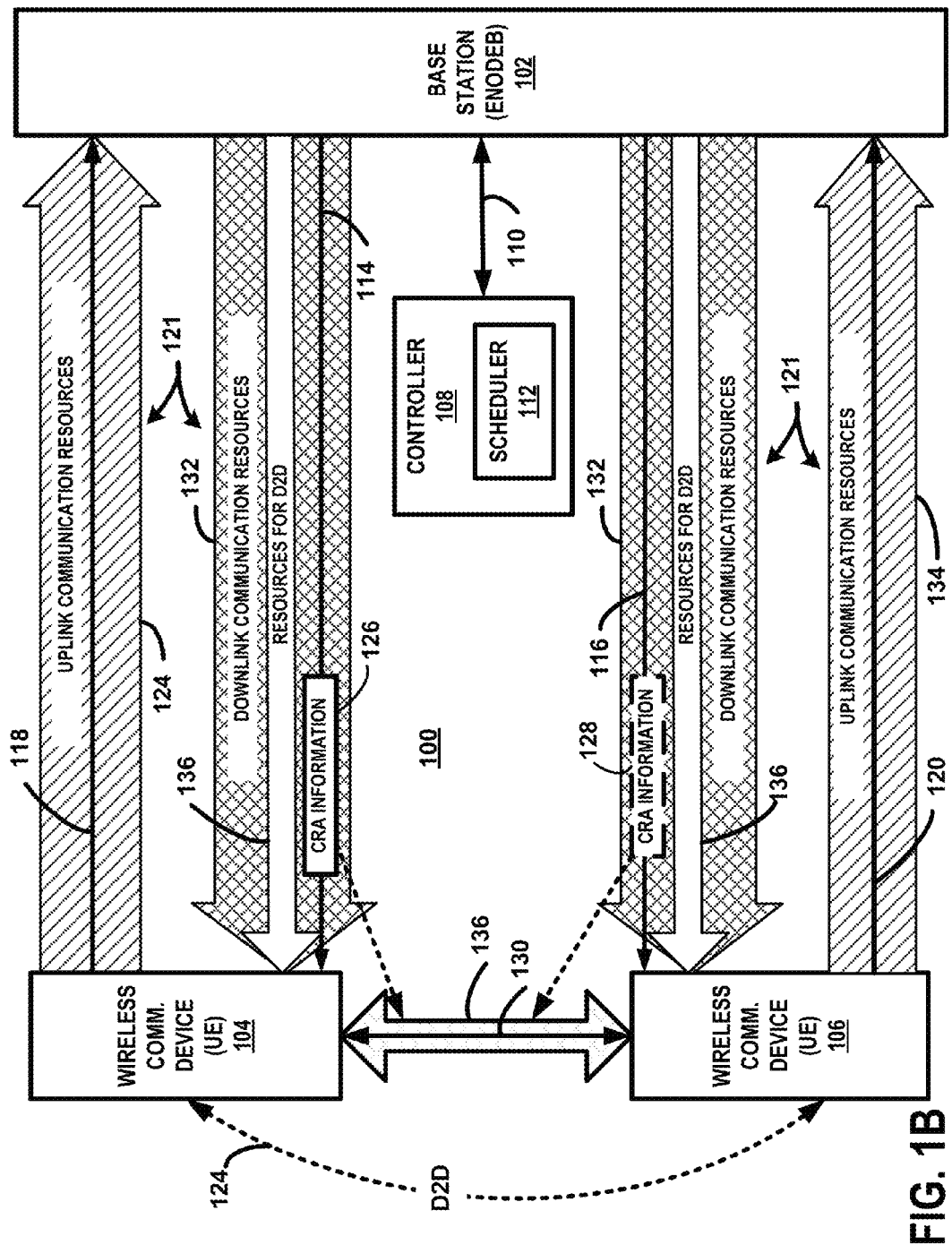
FIG. 1B is a block diagram of the wireless cellular communication system where downlink communication resources are used for device-to-device (D2D) communication.

FIG. 1B is block diagram of the wireless communication system where defined downlink communication resources are scheduled to D2D communication resources. Accordingly, the system 100 of FIG. 1B is an example of the system 100 of FIG. 1A. As discussed above, the communication system utilizes downlink communication resources 132 for downlink communication from a base station to wireless communication user equipment (UE) devices and utilizes uplink communication resources 134 for uplink transmissions from the UE devices to the base station. The uplink communication resources are different from the downlink communication resources.

In accordance with the examples below, some of the downlink communication resources 132 are assigned to device-to-device (D2D) communication between two UE devices as needed. The communication resources 136 assigned for D2D communication are not used for downlink communication. For example, if the communication resources are time-frequency communication resources, the time segments and frequency bands assigned to the D2D communication link are not used by the base station to serve non-D2D UE devices.

As described above communication resource information is provided from the base station to a UE device after the system controller 108 determines that a D2D link should be established between the UE device and another UE device. The base station may also send communication resource information to the other UE device to allocate D2D communication resources for transmission from the other UE device. The UE devices communicate using the assigned communication resources. As discussed herein, defined downlink communication resources are communication resources defined by a communication specification as the communication resources reserved for downlink communication from a base station to wireless communication devices, scheduled downlink communication resources are a subset of the defined downlink communication resources that have been assigned (scheduled) for downlink communication between a base station and a wireless communication device, and D2D communication resources are a subset of the defined downlink communication resources that have been assigned (scheduled) for device-to-device (D2D) communication between wireless communication devices.

In response to determining that two wireless communication devices should establish a D2D connection 124, the controller 108 allocates D2D time-frequency resources 136 to the wireless communication devices 104, 106 by providing communication resource allocation (CRA) information. The information may be transmitted in using any number of control signals, and/or messages. The CRA information 126, 128 identifies D2D time-frequency resources 136 of the downlink communication resources 132 to be used by the wireless communication devices in the D2D connection 124. The wireless communication device 104 receives the CRA information 126 and uses the allocated communication resources (time-frequency communication resources) to exchange D2D signals 130 with another wireless communication device 106 without communicating through the base station 102. In some circumstances, CRA information 128 may be sent to the other wireless communication device 106 identifying the downlink communication resources 136 for the D2D connection 124. As discussed below in further detail, downlink resources assigned to the D2D connections are not used for downlink communication by the base station. Also, as discussed below, additional information such as control and demodulation information may be exchanged between the wireless communication devices through the D2D link 124.

Figure 2:
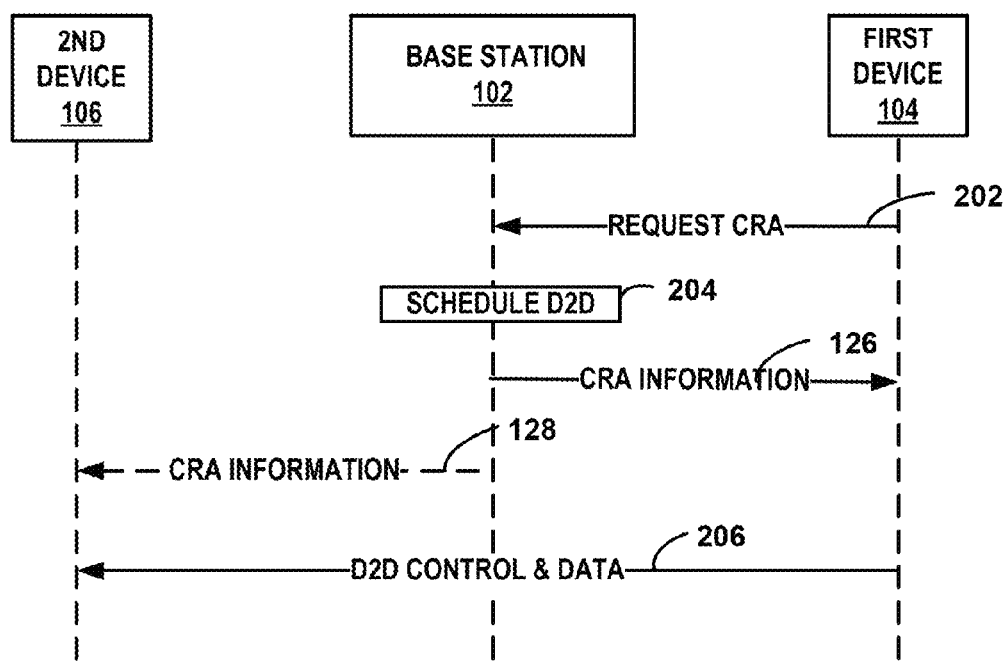
FIG. 2 is a messaging timing diagram for an example where a device-to-device (D2D) link is established.

FIG. 2 is a messaging timing diagram for an example where a device-to device (D2D) link 124 is established. The events and transmissions in FIG. 2 may be implemented in various ways depending on the particular system and communication specification.

The first device 104 transmits a communication resource allocation request 202 to the base station. Using an assigned uplink channel (scheduled uplink resources), the first device 104 transmits a message or control signal requesting resources for D2D communication with the second device 106.

The base station schedules the D2D communication at event 204. The scheduler 112 identifies the time-frequency resources that should be used by the devices 104, 106 for D2D communication.

The CRA information 126 is sent to the first device 104 and, optionally, the CRA information 128 is sent to the second device 106, where the CRA information identifies the communication resources that should be used and the physical format of the signal (modulation order, coding rate, MIMO configuration, etc.) for D2D communication between the two devices 104, 106. For example, the CRA information may include timing and frequency band information identifying time-frequency communication resources.

The first UE device sends D2D control and data information 206 to the second device using the allocated communication resources. In situations where the CRA information transmission 128 is omitted, D2D information intended for the second UE device is sent in the CRA information 126 and forwarded to the second UE device 106 in a D2D control channel at transmission 206.

Figure 3:
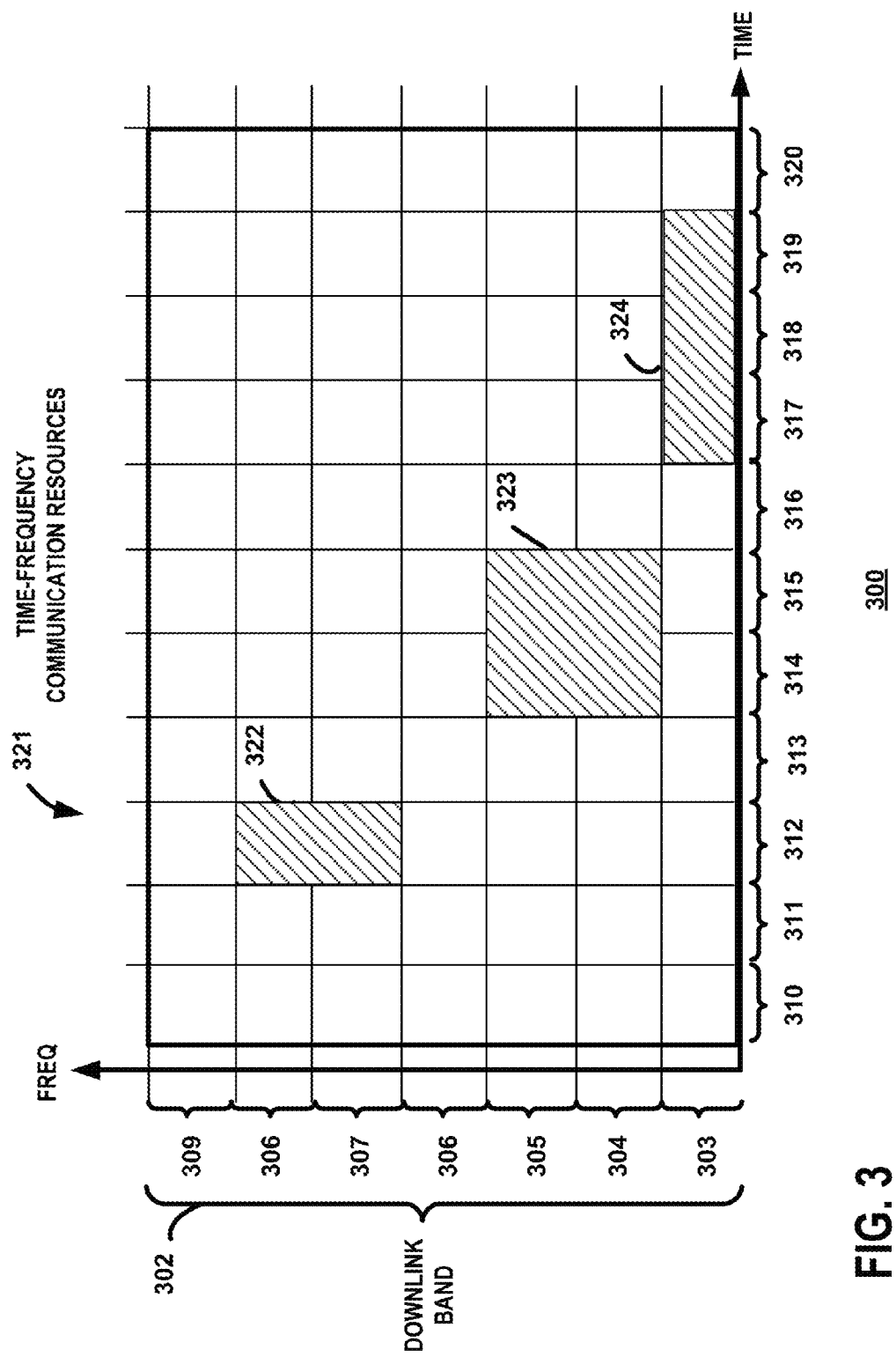
FIG. 3 is a graphical representation of an example of time-frequency communication resources in a downlink frequency band.

FIG. 3 is a graphical representation of an example of time-frequency communication resources 300 in a downlink frequency band 302. In order to efficiently use communication resources, frequency spectrum is divided in time and/or by coding. For example, in OFDM systems, information is transmitted over a large number of closely spaced orthogonal sub-carrier signals. Crosstalk between the sub-carriers is minimized since the carriers are orthogonal. Information is separated into parallel channels and distributed over the sub-carriers. Each sub-carrier is modulated with a modulation scheme. The subcarriers are also divided in time to further allow for communication with multiple devices. Although the various divisions of frequency and time may be referred to by different terms, the divisions in frequency may be referred to as frequency subcarriers 303-309 and the divisions in time may be referred to as time segments 310-320. The time segments and frequency subcarriers may be further organized, grouped, and identified in accordance with a communication specification and system operating rules. The resources, for example, may be organized into time slots, frames, sub-frames and symbol times in repeating patterns. A specific example is discussed below with reference to FIG. 4. Generally, however, the available downlink spectrum 302 is divided in frequency and time and the resulting time-frequency resource units 321 are assigned to transmissions. Each time-frequency resource unit may be assigned individually or in groups. For example, a transmission may be assigned to a single time segment 312 over multiple frequency subcarriers 307, 308 as for the first transmission 322, over multiple time segments 314, 315 and multiple frequency subcarriers 304, 305 as in the second transmission 323, or for a single frequency band 303 over multiple time segments 317-319 as in the third transmission 324. In some circumstances the resource units may be assigned non-contiguously. For example, transmission 322 and 324 may be assigned to single device for a transmission.

In conventional systems, all of the time-frequency communication resources of the downlink frequency band are assigned for transmission only from base stations to wireless communication devices. In the examples herein, however, some of the time-frequency communication resources are assigned to transmissions between wireless communication devices (UEs).

Figure 4:
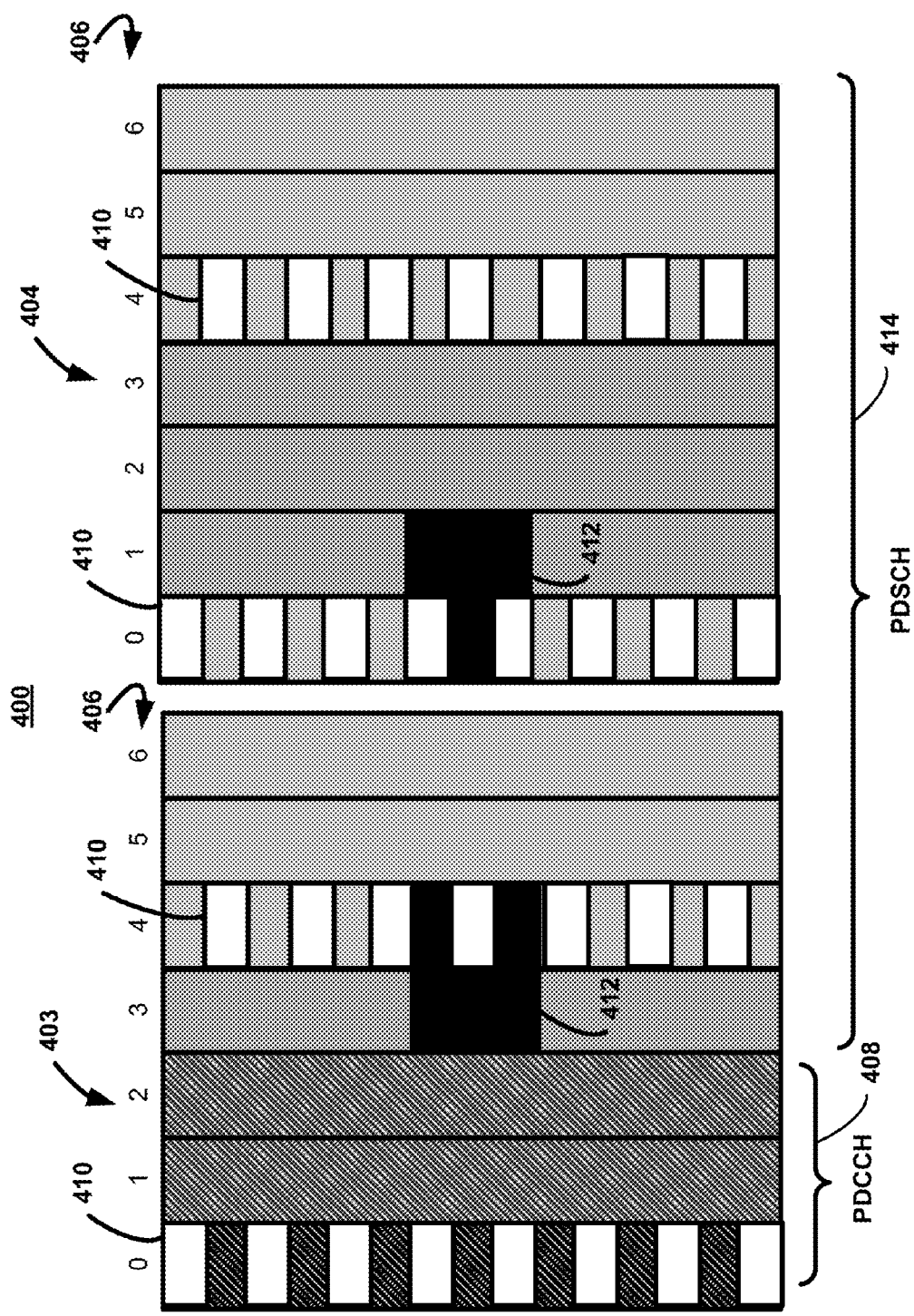
FIG. 4 is an illustration of a subframe in accordance with a 3GPP LTE communication specification.

FIG. 4 is an illustration of a subframe 400 in accordance with a 3GPP LTE communication specification. The subframe 400 includes two slots 402, 404, where each slot includes seven symbol times 406. The symbol times 0, 1 and 2 in the first slot 402 form a physical channel which is a Physical Downlink Control Channel (PDCCH) 408 in the specification. Pilot signals (or Reference Signals) 410 are injected at symbol times 0 and 4. The subframe 400 includes a channel that is a Physical Broadcast Channel (PBCH) 412 and spans portions of symbol times 3 and 4 of the first slot 402 and portions of symbol times 0 and 1 of the second slot 404. A data channel is provided by a Physical Downlink Shared Channel (PDSCH) 414 and is covered by the remainder of symbol times 3-6 of the first slot 402 and symbol times 1-6 of the second slot 404. The distribution and assignment of resource units depicted in FIG. 4 are provided as an example. Other combinations of resource blocks and resource elements may be used.

Figure 5:
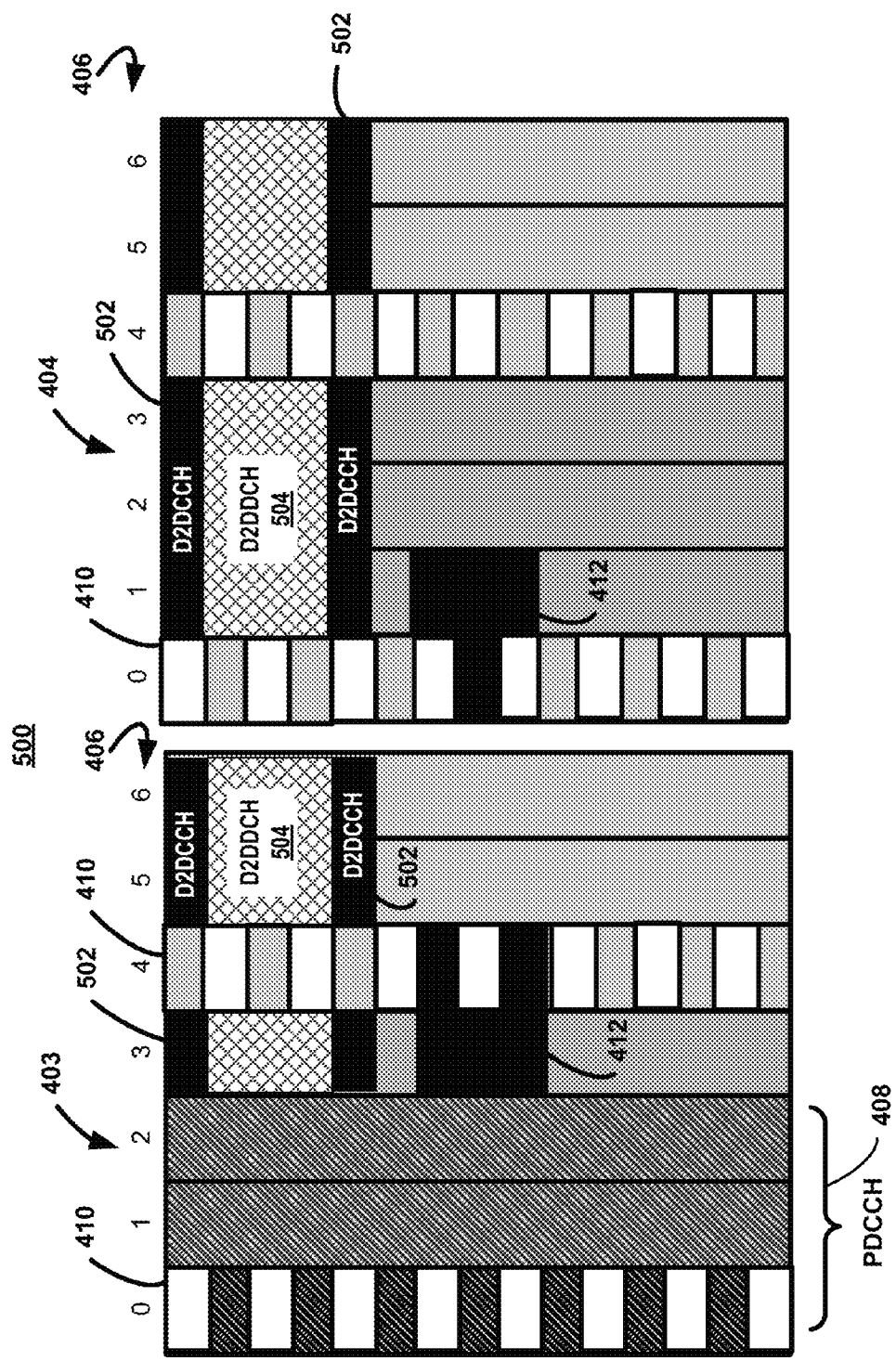
FIG. 5 is an illustration of an example of a subframe including device-to-device (D2D) channels for use in a system otherwise operating in accordance with a 3GPP LTE communication specification.

FIG. 5 is an illustration of an example of a subframe 500 including device-to-device channels 502, 504 for use in a system otherwise operating in accordance with a 3GPP LTE communication specification. Accordingly the exemplary subframe 500 is modified version of a conventional 3GPP LTE subframe such as the subframe 400 of FIG. 4. The subframe 500 includes two channels 502, 504 that are not defined in the current 3GPP LTE communication specification. The Device-to-Device Control Channel (D2DCCH) 502 provides for transmission of control information between two wireless communication devices 104, 106 operating in a peer to peer mode. The Device-To-Device Data Channel (D2DDCH) 504 for transmission of data between the two wireless communication devices 104, 106. FIG. 5 shows only one of numerous allocations of frequency time resources for the channels. Accordingly, other combinations of subcarriers and symbol times may be used for the D2DCCH 502 and the D2DDCH 504. Although some conventional channels may be omitted in order to provide resources for the D2D control channels, reference signals such as PBCH, PSS/SSS control channels are retained in order to maintain backward compatibility. For example, D2D resources are not scheduled in subframes/slots that contain PBCH and the synchronization channels (PSS/SSS). D2D data/control content is not assigned on resources reserved for reference signals in subframes.

Figure 6:
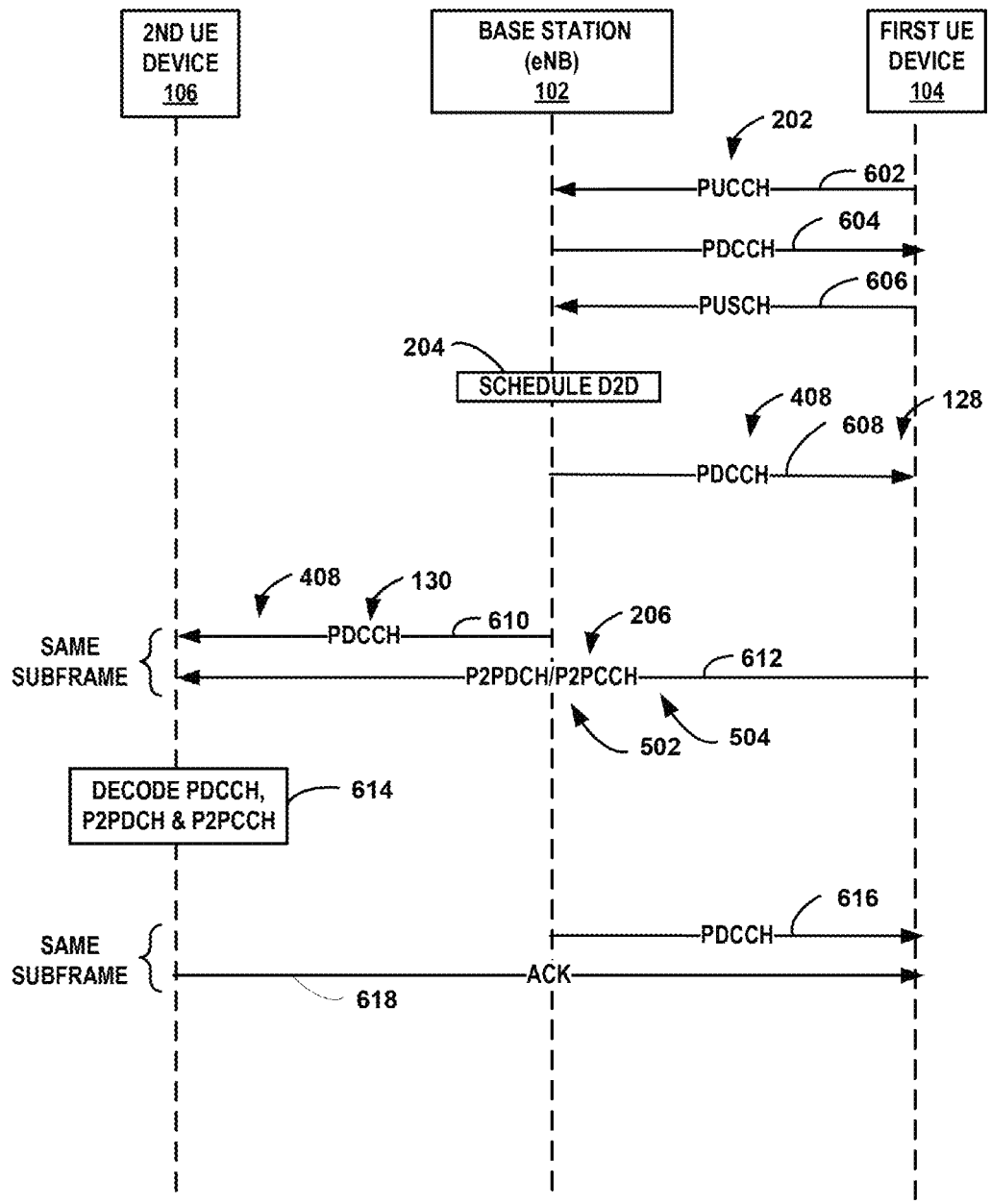
FIG. 6 is a messaging timing diagram for an example where a device-to-device (D2D) link is established in a system operating in accordance with a 3GPP LTE communication specification.

FIG. 6 is a messaging timing diagram 600 for an example where a device-to-device link 124 is established in a system operating in accordance with a 3GPP LTE communication specification. The messaging timing diagram 600, therefore, is an example of implementing the timing diagram 200 discussed with reference to FIG. 2.

For the example of FIG. 6, the first device 104 makes a CRA request 202 using multiple transmissions to the base station. Using a Physical Uplink Control Channel (PUCCH) transmission 602, the first UE device indicates that resources are requested for a D2D link. In conventional systems, a single bit flag is provided to indicate that uplink resources are needed. For the example of FIG. 6, an additional one bit flag is included in the PUCCH transmission 602 that indicates D2D resources are needed. In response to the PUCCH transmission 602, the base station 102 returns a Physical Downlink Control Channel (PDCCH) transmission 604 that includes scheduling grants to assign a predefined set of Physical Uplink Shared Channel (PUSCH) resources to the first UE device 104.

The first UE device 104 transmits buffer status and power headroom using the assigned PUSCH resources in the PUSCH transmission 606. The buffer status indicates the amount of D2D data and the priority of the data that the first UE device 104 has identified for transmission to the second UE device 106. The power headroom is the power difference between the maximum UE transmit power and the power that is needed to transmit. This is also a function of the interference and distance of the link. Power Headroom indicates to the eNB how much power it has available for modulation/coding rate/MIMO configuration/bandwidth to use in the next transmission. The first UE device 104 also includes information identifying the second UE device 106.

The scheduler 112 allocates the communication resources for the D2D link 124 at event 204. The allocation is similar to conventional scheduler functions except that the allocation takes into account the channel conditions between the two UE devices 104, 106 and the downlink channel conditions between the base station and the UEs. Examples of suitable techniques for determining channel conditions are discussed in patent application Ser. No. 14/357,748 entitled "TRANSMISSION OF DEVICE TO DEVICE SOUNDING REFERENCE SIGNALS USING MACROCELL COMMUNICATION RESOURCES", filed concurrently with this application and incorporated by reference in its entirety, herein.

CRA information 126 is sent by the base station 102 to the first wireless communication device 104 in a PDCCH transmission 608. The PDCCH transmission 608 is similar to a conventional PDCCH except that the parameters relate to the resources that are assigned for the D2D link 124 instead of macrocell communications. For example, the PDCCH indicates the resource allocation of the frequency/time grid, physical format (such as MCS, MIMO parameters, etc.), power control commands, a flag to indicate it is D2D type, and other transmission related information.

In some circumstances, a second CRA information transmission 128 is sent by the base station 102 to the second wireless communication UE device 106 in a PDCCH transmission 610. The second CRA information transmission 128 is optional since the information may be conveyed to the second wireless communication UE device over the D2D control channel transmission 612.

The D2D control information and data is sent from the first wireless communication device 104 to the second wireless communication device using the D2DDCH and D2DCCH in a D2DDCH/D2DCCH transmission 612. For the example, the PDCCH transmission 610 and the D2DDCH/D2DCCH transmission 612 are sent in the same subframe.

At event 614, the second wireless communication device 106 decodes the PDCCH, the D2DDCH, and the D2DCCH to determine the time frequency resources that will be used for D2D transmission by the first wireless communication device 104 to the second wireless communication device 106. The CRA information specifies the resources to use for ACKs. As discussed above, CRA information may be provided directly from the base station 102 or may be forwarded by the first UE device 104 over the D2DCCH transmission 612.

A PDCCH transmission 616 is sent from the base station 102 to the first communication UE device 104 providing downlink allocation information for the D2D communication link. Accordingly, the PDCCH transmission 616 provides information to the first UE device 104 to allow the first UE device 104 to receive ACK transmissions from the second UE device 106. The PDCCH 616 is optional. Alternatively, the first UE 104 can expect an ACK on the resource (time/subcarrier(s)) that were indicated to the second UE device 106 in the PDCCH transmission 610 or the D2DCCH transmission 612.

An acknowledgment (ACK) transmission 618 is sent from the second wireless communication UE device 106 to the first wireless communication UE device 104 acknowledging receipt of the P2P transmission 608. The ACK transmission is sent using a D2DACKCH assigned to the second wireless communication device 106.

Figure 7:
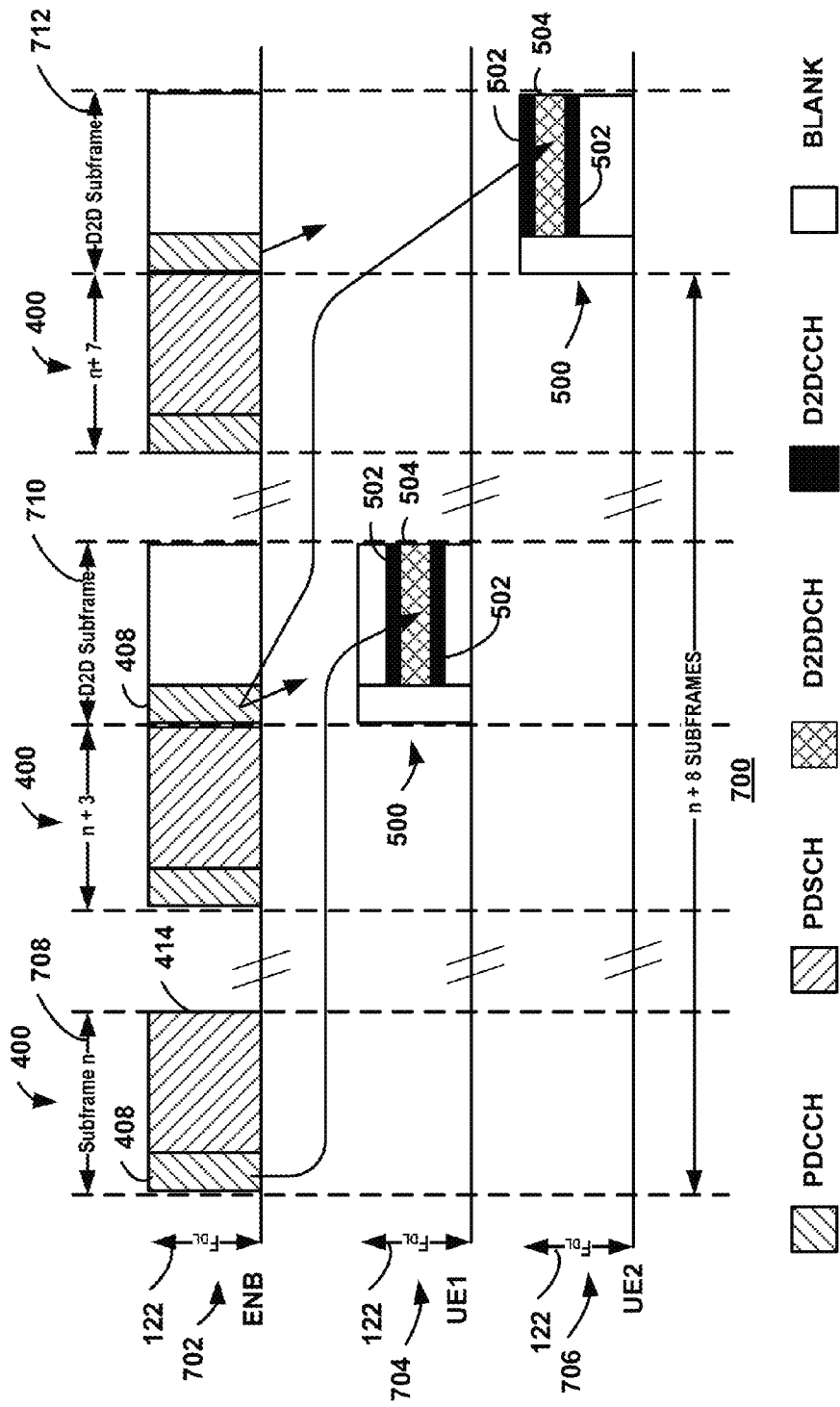
FIG. 7 is a diagram of transmissions from the base station (eNB) and the wireless communication devices (UEs) in accordance with 3GPP LTE communication specifications.

FIG. 7 is a diagram of transmissions 702, 704, 706 from the base station (eNB) 102 and the wireless communication devices (UEs) 104, 106 in accordance with 3GPP LTE communication specifications.

For the example of FIG. 7, the eNB transmission 702 begins with subframe n 708 having a PDCCH that includes the P2P control information assigning resources for P2P communication. Therefore, the CRA information transmission 126 is transmitted within the PDCCH. The D2D control information (CRA information 126) is directed to the first wireless communication device (UE1) for use by UE1 for a D2D transmission in a subsequent subframe. For the example, the D2D control information in subframe n 708 identifies communication resources for D2D transmission in the subframe n+4 710. The D2D control information, however, may identify communication resources in other subframes. The D2D control information indicates to the first UE device the subcarriers and symbol times to use for transmitting the D2D control messaging to the second UE and the subcarriers and symbol times to use for transmitting the D2D data to the second UE. Therefore, the CRA information 126 in the PDCCH identifies the D2DDCH 502 and the D2DCCH 504.

The PDCCH 408 in another subframe includes the CRA information 130 assigning D2D communication resources to the second UE. For the example, the CRA information 130 is transmitted in the subframe n+4 708 and assigns D2D resources for use by the second UE in subframe n+8 710. Other subframes can be used in some circumstances. Therefore, the CRA information 130 in the PDCCH of the subframe n+4 708 identifies the D2DDCH 502 and the D2DCCH 504 for the second UE in the subframe n+8 710. Other CRA information 128, 130 is transmitted in future subframes as needed.

Therefore, the eNB sends control signals in the PDCCH assigning downlink communication resources 122 for D2D communication between the UEs. The UEs transmit control signals and data to each other using the assigned downlink communication resources. In FIG. 7, the eNB transmission 702 in the D2D subframes 710, 712 are blank for the times when the UEs are transmitting in downlink channel. In some circumstances, however, the eNB transmission 704 is only blank for the time-frequency resources that are assigned for D2D communication. Accordingly, downlink communication resources that are not assigning for D2D communication in the D2D subframes can be used by the eNB for transmission to UEs.

Figure 8:
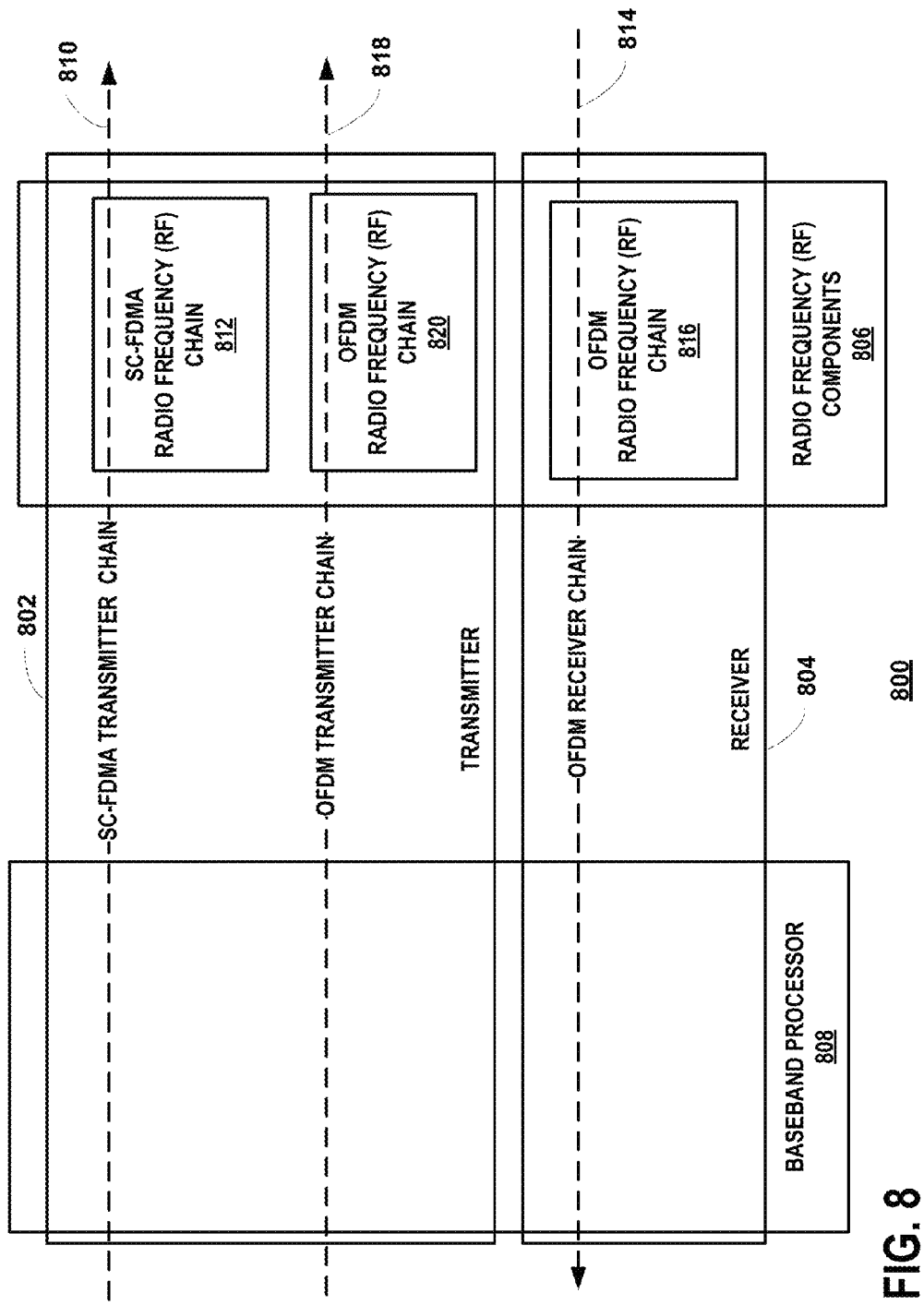
FIG. 8 is a block diagram of an example of transceiver in a wireless communication UE device.

FIG. 8 is a block diagram of an example of a transceiver 800 in a wireless communication UE device. The transceiver 800 includes a transmitter 802 and a receiver 804 which are implemented with radio frequency components 806 and a baseband processor 808. The transmitter 802 includes a SC-FDMA transmitter chain formed 810 by the baseband processor 808 and SC-FDMA RF components 812. The receiver 804 includes an OFDM receiver chain 814 formed by OFDM RF components 816 and baseband processor 808. The transceiver 800 is different from a conventional transceiver at least in that the transmitter 802 also includes an OFDM transmission chain 818 to transmit signals within the downlink frequency band 122. The OFDM transmission chain is formed by the base band processor 808 and OFDM RF components 820. As discussed below, the OFDM transmission chain 818 may be implemented with some of the OFDM RF components 816 of the receiver 804 in some circumstances. Since the OFDM transmission chain 818 and the OFDM receiver chain 814 both operate in the downlink frequency band, some of the RF components may be shared by the chains 114, 118.

Figure 9:
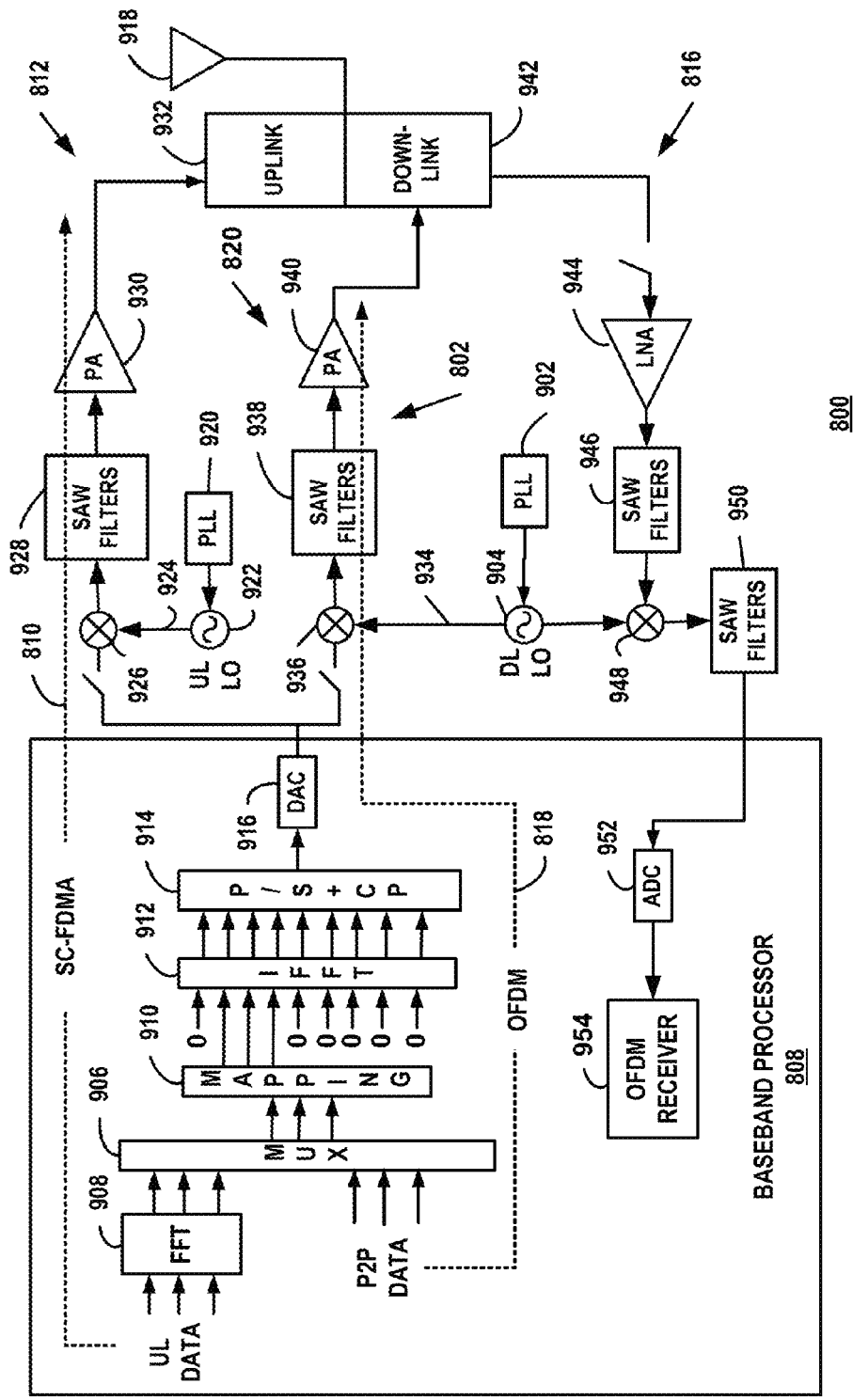
FIG. 9 is a block diagram of an example of an implementation of the transceiver.

FIG. 9 is a block diagram of an example of an implementation of the transceiver 800. As discussed above, the transceiver 800 is different from a conventional transceiver at least in that the transmitter 803 includes an OFDM transmission chain 818 to transmit signals within the downlink frequency band 122. Although the OFDM transmission chain 818 may be implemented with separate components, some of the components of the receiver 804 are used for the OFDM transmission chain 818 in the example. Since the OFDM transmission chain 818 and the receiver chain 814 both operate in the downlink frequency band, components such as the phase locked loop (PLL) 902 and downlink local oscillator 904 can be used for both the OFDM receiver 804 and the OFDM transmission chain 818.

The transmitter 802 also includes a Single Carrier-Frequency Division Multiple Access (SC-FDMA) transmitter chain 810 for transmitting uplink signals. The SC-FDMA transmitter chain 810 is similar to conventional transceivers accept that it is integrated with the OFDM transmitter chain 818. A multiplexer (MUX) 906 allows selection of the appropriate data streams for transmission. Fast Fourier Transform processing 908 is applied to the uplink data before being presented to the input of the MUX 906. When uplink data is transmitted, the MUX 906 selects the inputs corresponding to the output of the FFT processor 908 and forwards the data streams to the mapping process 910. The SC-FDMA radio frequency (RF) chain 810 is selected when the uplink data is to be transmitted. When the D2D data is to be transmitted, the MUX 908 forwards the D2D data streams to the mapping process 910 and the OFDM RF chain 818 is selected.

The various functions of the transceiver electronics are described in the functional blocks. Those skilled in the art will recognize the various ways to implement the functions in electronics of the transceiver electronics using devices, circuits and/or code, for example. A group of data bits can be taken from the data stream received from the MAC layer. This stream can be multiplexed into multiple streams which can be later coded and modulated to form multiple codewords. The channel coded signals are scrambled and modulated before mapping is performed. Typically, one-to-one mapping can be used for a codeword. In the case where the number of layers is greater than codewords to be transmitted, however, the mapping process 910 can assign the same codeword to two or more layers. The number of layers depends on the number of RF transmission chains and antennas.

A pilot signal is inserted into the parallel data and Inverse Fast Fourier Transform (IFFT) processing is applied by the IFFT function 912. P/S (Parallel to Serial) and then cyclic prefix is added by the P/S+CP function 914. The digital to analog converter (DAC) 916 converts the resulting signal to an analog signal which is processed by either the OFDM RF components 820 or the SC-FDMA RF components 812 before transmission through an antenna 918.

The SC-FDMA RF components 812 include a phase locked loop (PLL) 920 and an uplink oscillator 922 that provide an uplink local oscillator (UP LO) signal 924 to a uplink mixer 926 to up-convert the signal provided by the DAC 916 and shift it to the appropriate higher frequency in the uplink frequency band. One of more filters 928 filter the signal, and the power amplifier 930 amplifies the up-converted signal. The filtering may be performed at various points along the RF transmission chain. The resulting amplified and filtered signal is forwarded to a duplexer 932 to couple the signal to the antenna 918 for transmission.

When D2D data is transmitted and the OFDM RF components 820 are selected, the output of the DAC 916 is up-converted to the downlink frequency band 122. The downlink PLL 902 and downlink oscillator 904 generate and provide a downlink LO signal 934 to a downlink transmitter mixer 936. The DAC output carrying the D2D data is mixed with the downlink LO signal 934 and shifted to a frequency within the downlink frequency band 122. One of more filters 938 filter the signal, and the power amplifier 940 amplifies the signal. The filtering may be performed at various points along the RF transmission chain. The resulting amplified and filtered signal is forwarded to the duplexer 932 to couple the signal to the antenna 918 for transmission. Since the signal is within the downlink frequency band, it is injected on the downlink portion 942 of the duplexer 932.

The downlink receiver 804 receives downlink signals through the antenna 918 and duplexer 932. A low noise amplifier 944 increases the amplitude before the signal is filtered by one or more filters 946. The downlink LO is mixed with the filtered signal in a downlink receiver mixer 948 to down-convert the incoming signal and shift it to baseband. Additional filters 950 filter the signal before the analog to digital converter (ADC) 952 convert the signal to a digital signal that can be processed by the baseband OFDM receiver 854.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first user equipment (UE) used in a wireless cellular communication system, the first UE comprising:
   a transceiver; and
   a controller including at least one processor and at least one memory, the controller configured to perform direct device-to-device (D2D) communication with a second UE using a D2D link, wherein the controller performs processes of:
transmitting a scheduling request to a base station via a physical uplink control channel (PUCCH), the scheduling request requesting uplink resources;
using the uplink resources allocated by the base station to transmit a D2D buffer status report to the base station, the D2D buffer status report indicating amount of data to be transmitted on the D2D link;
receiving a first D2D control information addressed specifically to the first UE, from the base station via a physical downlink control channel (PDCCH), the first D2D control information indicating D2D resources allocated by the base station in response to the D2D buffer status report, wherein the D2D resources are a subset of defined uplink resources for the wireless cellular communication system, and the first D2D control information includes: time-frequency resource information for the D2D link; and a power control command for the D2D link;
transmitting a second D2D control information to the second UE via a D2D control channel (D2DCCH) based on the first D2D control information, the second D2D control information including at least a subset of the first D2D control information; and
transmitting the data to the second UE via a D2D data channel (D2DDCH) based on the first D2D control information.

2. The first UE according to claim 1, wherein the time-frequency resource information indicates time-frequency resources for transmitting the data on the D2D link, and the second D2D control information comprises the time-frequency resource information included in the first D2D control information.

3. The first UE according to claim 1, wherein the D2D buffer status report comprises information identifying the second UE.

4. A method for performing direct device-to-device (D2D) communication between a first user equipment (UE) and a second UE using a D2D link in a wireless cellular communication system, the method comprising:
transmitting a scheduling request to a base station via a physical uplink control channel (PUCCH), the scheduling request requesting uplink resources;
using the uplink resources allocated by the base station to transmit a D2D buffer status report to the base station, the D2D buffer status report indicating amount of data to be transmitted on the D2D link;
receiving a first D2D control information addressed specifically to the first UE, from the base station via a physical downlink control channel (PDCCH), the first D2D control information indicating D2D resources allocated by the base station in response to the D2D buffer status report, wherein the D2D resources are a subset of defined uplink resources for the wireless cellular communication system, and the first D2D control information includes: time-frequency resource information for the D2D link; and a power control command for the D2D link;
transmitting a second D2D control information to the second UE via a D2D control channel (D2DCCH) based on the first D2D control information, the second D2D control information including at least a subset of the first D2D control information; and
transmitting the data to the second UE via a D2D data channel (D2DDCH) based on the first D2D control information.

5. A method for controlling direct device-to-device (D2D) communication performed between a first user equipment (UE) and a second UE using a D2D link in a wireless cellular communication system, the method comprising:
receiving a scheduling request from the first UE via a physical uplink control channel (PUCCH), the scheduling request requesting uplink resources;
allocating the uplink resources in response to the scheduling request;
receiving a D2D buffer status report transmitted from the first UE using the uplink resources, the D2D buffer status report indicating amount of data to be transmitted on the D2D link;
allocating D2D resources in response to the D2D buffer status report; and
transmitting a first D2D control information to the first UE via a physical downlink control channel (PDCCH), the first D2D control information addressed specifically to the first UE, the first D2D control information indicating the D2D resources, wherein the D2D resources are a subset of defined uplink resources for the wireless cellular communication system, and the first D2D control information includes: time-frequency resource information for the D2D link; and a power control command for the D2D link.

* * * * *